United States Patent

Gonzalez

(10) Patent No.: US 9,787,425 B1
(45) Date of Patent: Oct. 10, 2017

(54) DEVICE AND METHOD FOR JAMMING OVER THE AIR SIGNALS IN A GEOGRAPHICAL DELIMITED AREA

(71) Applicant: Carlos M Gonzalez, Mission, TX (US)

(72) Inventor: Carlos M Gonzalez, Mission, TX (US)

( * ) Notice: Subject to any disclaimer, the term of this patent is extended or adjusted under 35 U.S.C. 154(b) by 0 days.

(21) Appl. No.: 15/404,061

(22) Filed: Jan. 11, 2017

(51) Int. Cl.
*G01S 7/02* (2006.01)
*H04K 3/00* (2006.01)

(52) U.S. Cl.
CPC ............... *H04K 3/43* (2013.01); *H04K 3/80* (2013.01); *G01S 7/021* (2013.01); *H04K 2203/16* (2013.01); *H04K 2203/18* (2013.01)

(58) Field of Classification Search
CPC ........ H04K 2203/18; H04K 3/42; H04K 3/43; H04K 2203/16; H04K 2203/36; H04K 2203/32
USPC .......... 455/1, 67.11, 226.1, 63.1, 445, 422.1, 455/403, 550.1, 426.1, 426.2, 404.1, 455/404.2, 521; 370/310, 252, 328, 329, 370/338
See application file for complete search history.

(56) References Cited

U.S. PATENT DOCUMENTS

| | | | |
|---|---|---|---|
| 5,001,771 A | 3/1991 | New | |
| 5,220,680 A | 6/1993 | Lee | |
| 7,023,374 B2 | 4/2006 | Jossef et al. | |
| 7,123,874 B1 | 10/2006 | Brennan | |
| 7,505,730 B2 | 3/2009 | Huang | |
| 7,697,885 B2 | 4/2010 | Stoddard | |
| 7,738,831 B2 | 6/2010 | Nath et al. | |
| 7,853,195 B2 | 12/2010 | Higgins | |
| 7,876,205 B2 | 1/2011 | Catten et al. | |
| 7,933,547 B2 | 4/2011 | Brown et al. | |
| 7,949,296 B2 | 5/2011 | Arend et al. | |
| 2004/0077339 A1 | 4/2004 | Martens | |
| 2008/0096518 A1* | 4/2008 | Mock | H04W 48/04 455/404.1 |

OTHER PUBLICATIONS

Wi-Fi jammers on the Web. http://www.jammer-store.com/WiFi-bluetooth-jammers-blockers.html.
Alex Mikhalchuk. How Mobile Jammers Work. Jammer-Store Blog, http://blog.jammer-store.com/2009/11/how-mobile-jammers-work/, Nov. 26, 2009 in Gadgets.
Cognio spectrum expert for Wi-Fi interference monitoring. http://en.wikipedia.org/wiki/Cognio#Cognio_spectrum_expert_for_Wi-Fi_interference_monitoring.

* cited by examiner

*Primary Examiner* — Keith Ferguson

(57) ABSTRACT

The present invention is generally related to a device for providing wireless jamming signals in a delimited geographic area. The device is comprised of an on/off initiation module that allows the user to turn-on or turn-off the device, and initialize the jamming wireless signals device, a central controller module to distribute and analyze the information of the system, a signal transmitter device to transmit the jamming signals, a device to calculate distances to obtain the distances between the said signal transmitter and the objects in the delimited geographic area. The jamming device once is turned on calculates the distances and the power where to transmit the jamming signals to cover the required geographic area. This device will be capable of jamming one or more types of wireless signals at the same time such as Wi-Fi, cell phones and other wireless signals.

6 Claims, 5 Drawing Sheets

DEVICE AND METHOD FOR JAMMING OVER THE AIR SIGNALS IN A GEOGRAPHICAL DELIMITED AREA

This application claims priority to U.S. Provisional Application No. 62/297,245 filed on 19 Feb. 2016, entitled: Device and Method for Jamming Wireless Signals in a Geographical Delimited Area, which is hereby incorporated by reference in its entirety.

BACKGROUND OF THE INVENTION

The Wi-Fi (abbreviation for Wireless Fidelity), is a set of standards compatible for local networks) was created to be used in mobile devices and LANs (Local Area Network), but it is now used for Internet and wireless access VoIP (Voice over Internet Protocol). It allows a person with a computer to have an wireless connection, a PDA (personal digital assistant), o to a wireless telephone VoIP to connect to the internet when is in proximity to the access point. The geographic region covered by one or more access points are called "hotspot".

A hotspot is any public area where computers equipped with the technology of wireless network can have access to the internet. The computer does this by contacting a wireless network using its internal NIC (Network Interface Card). The NIC searches the waves of radio generated by the wireless networks. When a strong enough signal is detected, it asks for permission to enter the. This access can be free or require registration in the network before obtaining permission to get in.

A network that generates a hotspot consist basically of a wireless router and a modem. The RF, or radio frequency, are waves utilized by a wireless network and they extend in all directions from the central location of these devices before they weaken for lack of power of the signal or interference. If a computer is inside this umbrella of RF, it will have the capacity of connecting to the network. This area is the hotspot. As the computer moves away from the routing devices and modem, the connection will become weaker and slow. The quality of the connection deteriorates quickly at the borders of this umbrella. The computer will lose completely the access if it gets out of the hotspot.

Many points of access and interfaces with the network support varying degrees of encryption to protect the traffic of interceptions. Wi-Fi is a set of global standards. Different from the cellular telephones, the same Wi-Fi client works in different countries of the world.

Problems of interoperability between brands or deviation from the standards could interrupt the connection or lower the performance of the speed in another user's devices being inside the range. The Wi-Fi Alliance establishes tests for the devices interoperability, and if the devices pass the tests are marked as Wi-Fi Certified.

The use of the bandwidth 2.4 GHz for Wi-Fi does not require a license in most countries as long as it stays below the regulatory limits and it does not interfere with other sources, including making the user device not functioning any more.

The use of frequency bandwidth is shared with applications of free-license and tolerant-to-error such as Networks of Wireless Sensors in bandwidths 868 MHz, 915 MHz and 2.450 GHz, also the Wi-Fi and cellular phones bandwidths 915 MHz, 2.450 GHz, and 5.800 GHz.

The assigning of frequency spectrum and limitations are not consistent all over the world: most European countries allow two additional channels to those in the USA for the bandwidth 2.4 GHz (1-13 vs. 1-11), while in Japan they have one more channel (1-14).

There are cases in which you want to jam intentionally the RF signal. For example in a meeting room, you may require that all the attendants be paying attention to what's happening at the meeting, and that there are no interruptions because of phone calls or reading their e-mail.

As any radio jammer, the phone jammer sends radio waves of the same frequency used by the phones. This causes enough communication interference between the cellular phone and the signal tower to make the phone unusable. In most cellular phones the network will appear simply as out of range. Most cellular phones use different bands to receive and send communications with the signal tower (it is called frequency division multiplexed or FDD). The jammers could work by means of interrupting the frequency signal from the phone to the tower or from the tower to the phone. Small hand held devices jam al bands from 800 MHz to 1900 MHz inside a range of 9 meters [Mik-09].

Is interesting the fact that it does requires less energy to interrupt the signal from the tower to the mobile phone than from the phone to the tower (also called base station), since the station is usually localized a greater distance from the jammer than the mobile phone, and it is the reason that the tower signal is not that strong.

The jammers actively emit radio signals, it may be possible that is not legal to be possessed or operated based in specific laws from the area where they are located. Examples of some countries:

Canada: illegal, except for federal agencies in charge of applying the laws and have been approved.

Popular Republic of China: used by educational departments of the government as a means to frustrate the cheating at school. During end of the year exams the phone jammers are used in all areas around high schools to prevent students inside receiving calls or messages that can be used for illegal purposes. In some municipalities instead of using jammers, the signal towers close to the school are temporary closed for the duration of the week of exams.

Mexico: legal inside jails, only used in churches and hospitals.

United Kingdom: illegal to use, but legal to have. Installing inside jails has been proposed.

United States of America: jammers of phones are used by federal agents under certain circumstances. The privacy rights of the owners could affect the policy and use inside buildings. The Federal Communication Commission FCC) can give a permission to overrule the laws of private use. For radio communications it is illegal to operate, manufacture or offer for sale including announcements.

Today there are many jammers of wireless signals, mainly for cellular phones [Hua-09], [Bre-06], [New-91] [Lee-93]. As far as Wi-Fi jamming, most of the devices that exist are to monitor the existence of interference with a PC [Wiki1-09]. You can find a list of products for jamming Wi-Fi in [Jam-11]. There are a great variety of jammers when the user of the mobile device is in a car [Cat-11], [Bro-11], [Nat-10], [Mar-04], and general signal jammers [Hig-10], [Jos-10], [STO-10] [Are-11].

All the jammers of wireless signals before mentioned have in common that there is no delimiting of the geographical location where the jamming is done. This jamming is delimited only by the power of the generated signal. There are many cases which it is desired to jam a specific area, for example you may want to jam a meeting room, a movie theatre, a classroom where a professor is teaching, a church, etc., and you don't want to interfere with other close areas or nearby spaces to the area you want to jam. For example a professor may not want his students to have access to internet inside the classroom so that the students do not distract themselves, but the professor in the adjacent classroom needs for his students to have access to the internet in his classroom. A company requires that all persons in assistance to a meeting room do not have access to their cell phones or internet, and avoid interruptions, but any other area outside of this meeting room must have all the wireless signal services of cellular phones and internet.

The present patent provides a solution to the problem of how to restrict the wireless signal in a specific geographic area. In order to generate jamming signals in a delimited geographical area this patent obtains and calculates in which direction and at which power the emitter of jamming signal should send its jamming signals. This jamming signal will make all the devices that are inside the geographical area and are using the signal that is being jammed unable to receive correctly (unusable) the wireless signal. Examples of these wireless signals that could be jammed are the signals for cellular phones and internet signals. This patent will cover an important part of today's commercial market needing protection like schools, universities, companies, churches and movie theaters among others. Civil protection and the military are also markets in need of our patent.

REFERENCES

[Hig-10] Higgins Robert P. Adaptive RF canceller system and method. U.S. Pat. No. 7,853,195 December 2010.
[Cat-11] Catten Jonathan C. et al. System and method for detecting use of a wireless device in a moving vehicle. U.S. Pat. No. 7,876,205 January 2011.
[Hua-09] Huang Dennis. Cellular phone jammer that permits cellular communication in an emergency. U.S. Pat. No. 7,505,730 March 2009.
[Bre-06] Brennan Joseph P. Cellular phone blocker. U.S. Pat. No. 7,123,874 October 2006.
[Jos-10] Jossef Abraham, et al. Method and apparatus for signal detection and jamming. U.S. Pat. No. 7,023,374 April 2006.
[STO-10] Stoddard Robert Eugene. Multi-band jammer. U.S. Pat. No. 7,697,885. April 2010.
[Jam-11] WI-FI jammers on the Web. http://www.jammer-store.com/WiFi-bluetooth-jammers-blockers.html.
[Bro-11] Brown Craig S. Apparatus and method for interfering with wireless communications devices positioned in a volume occupied by a human driver. U.S. Pat. No. 7,933,547 April 2011.
[Nat-10] Nath Sanjeev et al. Method for automobile safe wireless communications U.S. Pat. No. 7,738,831 June 2010.
[Mar-04] Martens Stephen W. Forced cell phone call disruption device. US Patent Application 20040077339 April 2004.
[New-91] New Anthony M. Communications jammer. U.S. Pat. No. 5,001,771 March 1991.
[Lee-93] Lee William C. Y. Frequency signal generator apparatus and method for simulating interference in mobile communication systems. U.S. Pat. No. 5,220,680 June 1993.
[Are-11] Arend Brian L, et al. Wireless telecommunications signal inhibition. U.S. Pat. No. 7,949,296 May 2011.
[Mik-09] Alex Mikhalchuk. How Mobile Jammers Work. Jammer-Store Blog, http://blog.jammer-store.com/2009/11/how-mobile-jammers-work/, Nov. 26, 2009 in Gadgets.
[Wik1-09] Cognio spectrum expert for Wi-Fi interference monitoring. http//en.wikipedia.org/wiki/Cognio#Cognio spectrum expert for Wi-Fi interference, monitoring.

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
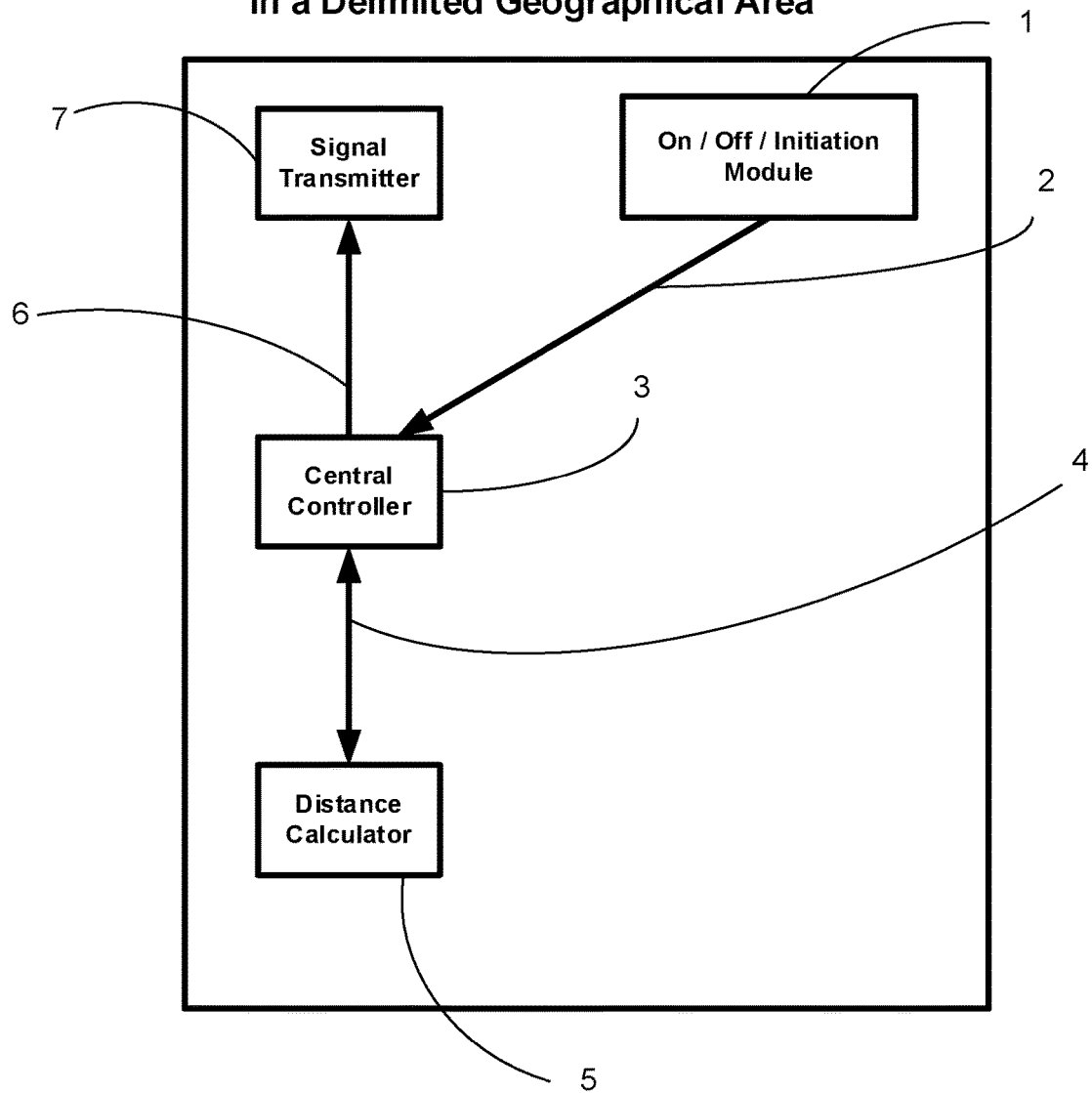
FIG. 1 is a high level system diagram illustrating the logical components of a Jamming System of Wireless Signals in a Delimited Geographical Area made according to the aspects of the present invention.
Figure 2:
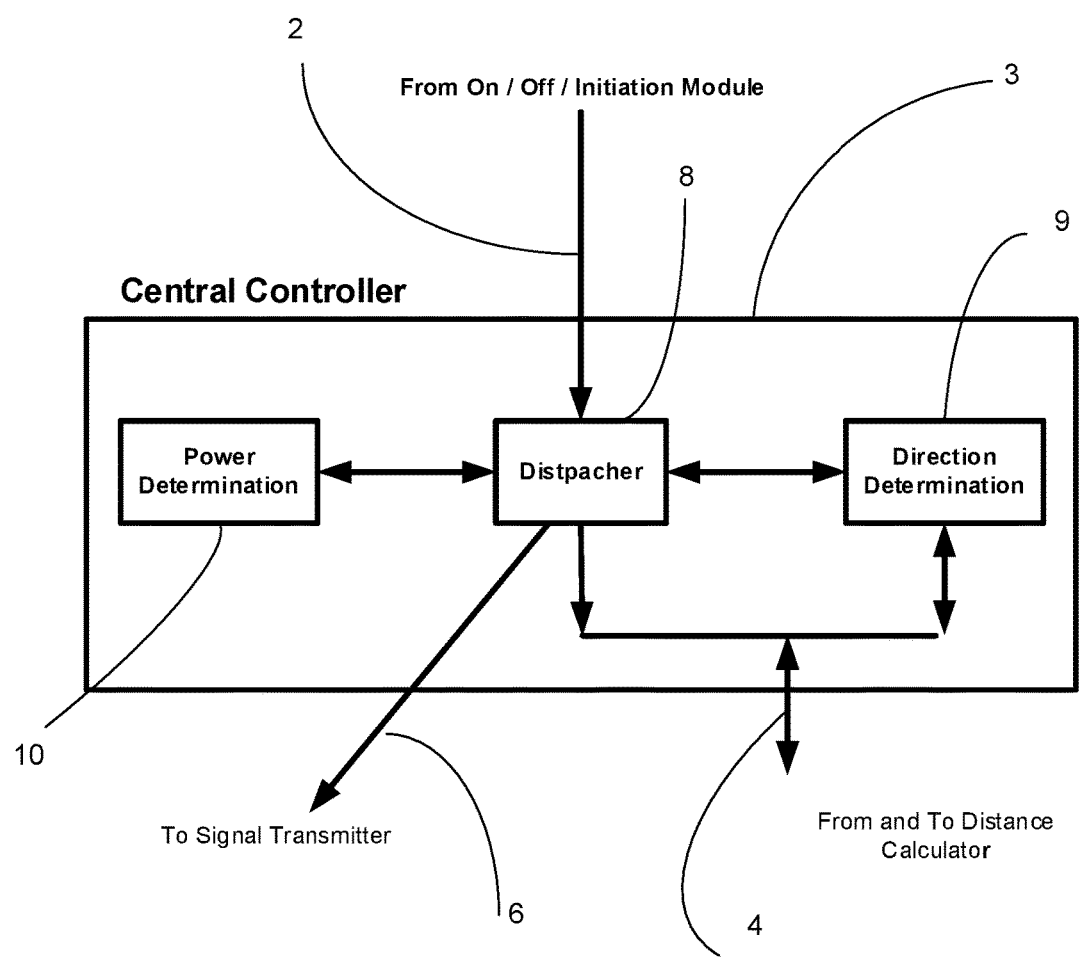
FIG. 2. is a high level system diagram of the basic functional decomposition of the Central Controller Module.

FIG. 1 shows the Jamming System of Wireless Signals in a Delimited Geographical Area. When the system is turned on by the user, the On/Off Initiation Module 1 determines the type of signal to generate for the Central Controller 3. If the device is turned on by the first time, signal 2 is an initialize signal, if the device is turned on subsequently, the On/Off Initiation Module 1 will determine if the date to calculate signal for this area is past due. If this is the case a signal 2 of initiation is generated otherwise an On signal is generated. The date for recalculating signals will be set on each device (e.g. every month, every 15 days, etc.) This signal 2 goes to the Central Controller 3 to initiate the system and make it operational. The Central Controller 3 will send signals 6 and 4 for the Distance Calculator module 5 and Signal Transmitter 7 respectively be turned on, initialize their devices and wait for commands to execute. The Central Controller is comprised by three modules (see FIG. 2): The Dispatcher module 8, the Direction Determination module 9, and the Power Determination module 10. After the Central Controller 3 sends its initialize signal through the Dispatch Module 8 to the Distant Calculator 5 and the Signal Emitter 7, the Dispatch Module 8 depending if it is an ON signal (requiring to use the calculations done previously for power and distance since it is assumed that there is no change in the geographical area) a signal 6 is sent directly to the Signal Emitter 7 to use the previously existent list (that has been previously saved in permanent storage of this module) of all the directions and power where the signal should be send; or if the ON signal is to initialize (requires to re-calculate again all the information about direction and power for the geographical area), it will then communicates with the Direction Determination Module 9 to start obtaining the directions (composed of values 0-180 degrees for the rotation angle, and from 0-90 degrees for the incline angle) in which measurements will be taken. The Direction Determination Module 9 executes the Algorithm "Get Inclination and Distance" for each degree of angle rotation. In this algorithm, the Direction Determination Module 9 communicates with the Distance Calculator 5 to calculate the distance for the given direction. The algorithm finds the initial incline angle where the jammer should begin, and from this angle until 90 degrees of incline the algorithm returns a list of all the incline angles and distance for the rotation angle and are passed to the Dispatch Module 8 to store the results. If all the degrees have not being analyzed, it communicates with the Direction Determination Module 9 to proceed to calculate a new direction. This cycle is repeated taking measurements until measurements of direction and distance cover the 180 degrees of rotation.

Figure 5:
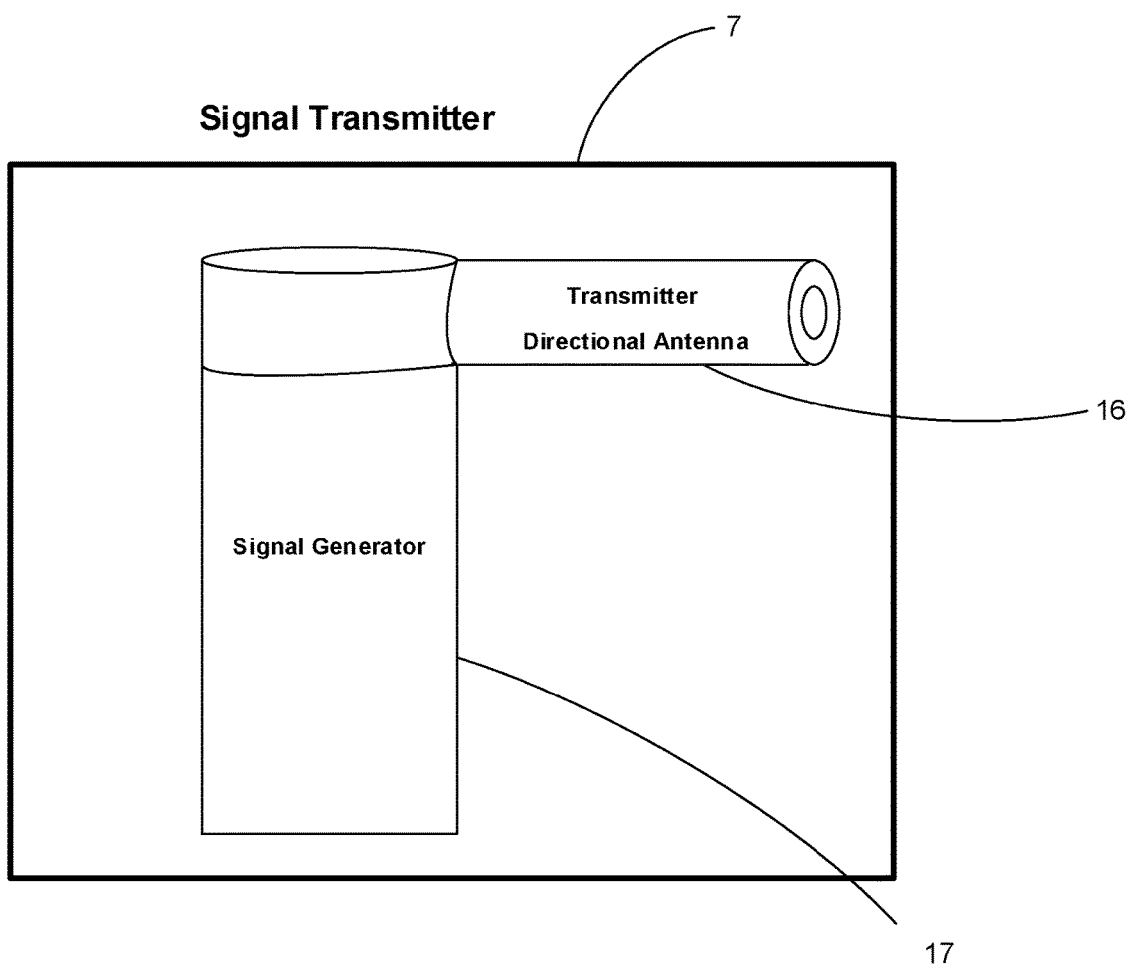
FIG. 5. Is a high level system diagram of the basic decomposition of the electronic components of the Signal Transmitter Module.

Once the Dispatch Module 8 has all the directions and distance required, this information is passed along to the Power Determination 10, where the power of the jamming signal needed for each one of the directions sent by the Dispatch Module 8. With This information the Dispatch Module 8 sends signal 6 to the Signal Transmitter 7 one by one all the directions in which the Transmitter Directional Antenna 16 (see FIG. 5) should position and send the jamming signal. Thus, the Signal Transmitter 7 proceeds to position the Transmitter Directional Antenna 16 by rotating and inclining to obtain the right rotation and incline angle. Once in position the Signal Generator 17 proceeds to generate the jamming signal with the required power. This process is done in a continuous cycle for all the directions and powers obtained. The Signal Transmitter 7 has a permanent internal memory where this information is stored, then the Dispatch Module 8 will only send once the list of all the directions and power where the signal should be send. The Signal Transmitter 7 will continue using the list in its permanent memory in acyclic form until is order to stop. This cycle will stop until the On/Off Initiation Module 1 sends a signal 2 of turning off the system to the Central Controller 3, and this module will be in charge of turning off the Distance Calculator 5 and the Signal Transmitter 7.

Algorithm: Get Inclination and Distance
'Input to the procedure:
'a) rotation angle
'Output of the procedure
'list (call list_measure) with angles (incline and rotation) and measurements
'
Start Algorithm
  mesure_before=0
  angle_goal=45
  Loop for angle 0 to 90
  With angle calculate mesure_with_angle_now
  If mesure_before <mesure_with_angle_now then
    Save angle mesure_with_angle_now like angle_goal
    Make mesure_before=mesure_with_angle_now
    Loop to use another angle
  Else
    Exit cycle
  End of If
  Re-Cycle
  Loop for angle_goal to 90
  With angle calculate mesure_with_angle_now
  Save in list_measure:
    The angle, rotation angle and mesure_with_angle_now
  Increase angle
  Re-Cycle
End of Algorithm.

Figure 3:
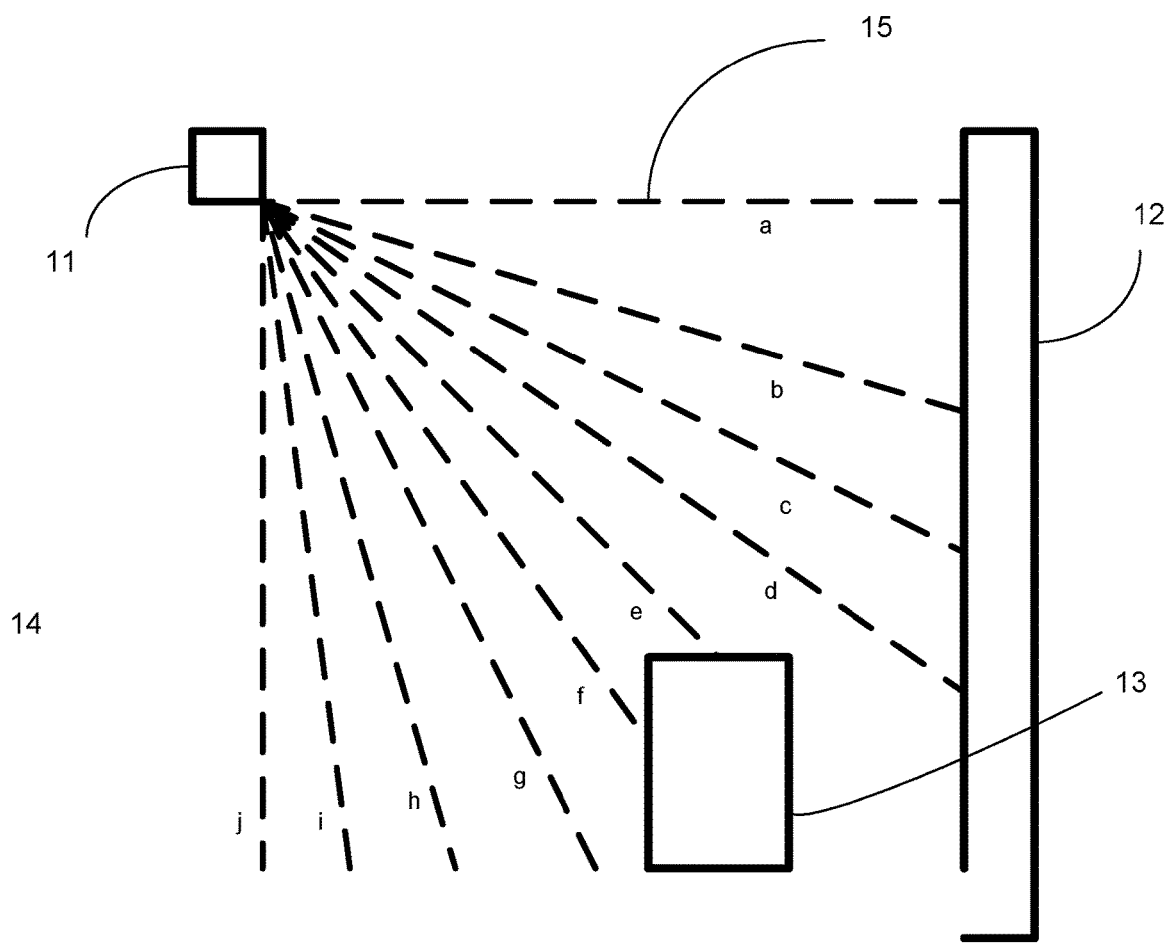
FIG. 3. Is a perspective diagram of the system calculating distances in an example of a geographical delimited area.
Figure 4:
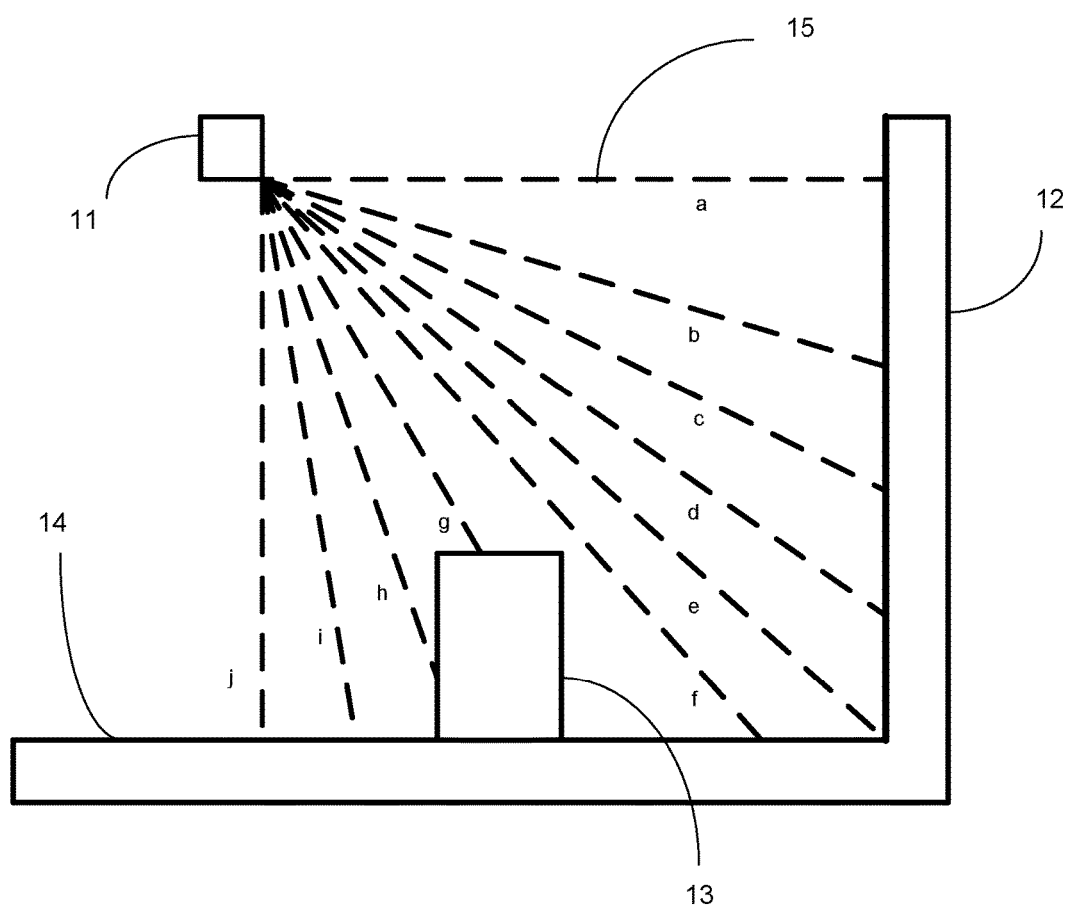
FIG. 4. Is a perspective diagram of the system calculating distances in another example of a geographical delimited area.

FIGS. 3 and 4 show all the measurements that the system is going to take for these examples. These measurements are the distance between the Signal Emitter 7 and the closes obstacle in that direction of rotation. The system starts with measurements at 0 degrees until 90 degrees. FIG. 3 shows a room that has a signal emitter 11 localized on the roof of the area to jam. This area is delimited by a Wall 12 and a flor 14. In this area is also located object 13. The algorithm starts by obtaining distances 15 from the signal emitter to the existent objects in the room. The first measurement is of longitude "a", before taking the second measurement the algorithm changes the angle of incline (let's say 1 to 1.5 degrees). Takes measurements "b", "c", "d", "e", "f", "g", "h", and "i". The system saves all the measurements and incline angles for all the measurements. Starting with measurement "a", the system checks if the next measurement is greater than the previous one, takes the previous measurement and checks with the next and so on until the next measurement is less than the one we are observing. For example in the case of FIG. 3, the measurement where there is a change of distance from more to less is between "d" and "e". Then the algorithm will return only the measurements "d", "e", "f", "g", "h", and "i" and their angles of incline. FIG. 4 shows also a geographic area similar to the one in FIG. 3, the only change is object 13 that is closer to signal emitter 11. The algorithm will proceed in the same manner explained before, only now the measurement where there is change is between "e" and "f". Therefore, the algorithm will return only the measurements "e", "f", "g", "h", "i" and "j" and their angles of incline.

If the signal emitter 11 is on the roof it will have only 180 degrees of rotating directions where to send the signal. It will have 90 degrees of inclination possible for every rotational direction. There are many ways of how to implement this signal emitter 11. The most obvious implementation is with only one transmission directional antenna capable of rotating 180 degrees and 90 degrees of incline. Having a mechanical element (to make the rotations and inclines) in the transmitter of signals may make it slow and increases the possibility of frequent maintenance problems.

The other extreme is if we could have a mini transmission directional antenna for every degree of the required rotational direction and for each angle of incline. This may implies 180*90=16200 mini transmission directional antennas. If this implementation is too costly or cumbersome, we could implement a mini transmission directional antenna every 5 degrees. This will reduce to 648 the number of mini transmission directional antennas required.

The advantage of having one mini transmission directional antenna for each degree of rotation and each degree of incline is that the jamming signals will be send quicker and there are no mechanical elements. On the other hand we may have a mini transmission directional antennas that covers several degrees of rotation and incline when the signal is sent, therefore needing less antennas. Another possible implementation will be to have a smaller number of mini transmission directional antennas and that some or all have the capability of rotating and inclining.

The subject matter of this invention is the jamming of over the air signals in a delimited geographical area.

The disclosure of the invention described herein-above represents the preferred embodiment of the invention; however, variations thereof, in the form, construction, and arrangement of the component thereof and the modified application of the invention are possible without departing from the spirit and scope of the appended claim.

I claim:

1. A device for jamming wireless signals in a geographic delimited area comprising: an ON/Off Initiation Module that allows a user of the device to turn on, turn off, and initialize the jamming wireless signals; a Central Controller Module to distribute and analyze all signals and data of the device; a Signal Transmitter device to transmit jamming signals comprised of at least one Transmitter Directional Antenna; a Distance Calculator device to obtain an angle of rotation, angle of incline and distances between said Signal Transmitter and any existent physical objects preventing signals emitted by said Calculate Distance device to continue traveling through the air in the delimited geographic area; where said Central Controller communicates with said Distance Calculator and obtains a direction list comprising all angles of rotation and angles of incline where said Signal Transmitter will send the jamming signals; where said Central Controller calculates the power needed to send the signal transmitted by said Signal Transmitter to all the directions in said direction list; where said Central Controller sends to said Signal Transmitter a transmit list comprised of angle of rotation, angle of incline and power for each of the signals that will be transmitted for jamming the said geographic area; where said Signal Transmitter once it receives the said transmit list of angle of rotation, angle of incline and power for each of the signals from said Central Controller saves said transmit list in its own memory and proceeds to transmit a jamming signal for every element in said transmit list starting a cycle from a first element in said transmit list to a last element of said transmit list, such that when said Signal Transmitter transmits the signal for the last element of said transmit list, said Signal Transmitter continues to use the first element of said transmit list repeating said cycle until it receives a command from said Central Controller to stop transmitting the jamming signals.

2. A device for jamming wireless signals in a geographic delimited area of claim 1; where said ON/Off Initiation Module communicates with the user via remote control signals.

3. A device for jamming wireless signals in a geographic delimited area of claim 1; where said Signal Transmitter comprised multiple Transmitter Directional Antennas for transmitting the signals that come in said transmit list of angle of rotation, angle of incline and power.

4. A device for jamming wireless signals in a geographic delimited area of claim 3; where said Signal Transmitter is capable of changing the angle of rotation of some of its Transmitter Directional Antennas, and change the angle of incline of some of its Transmitter Directional Antennas.

5. A device for jamming wireless signals in a geographic delimited area of claim 1; where said Signal Transmitter does not have its own internal memory, and will receive information of said transmit list of angle of rotation, angle of incline and power from said Central Controller one element of said transmit list at the time.

6. A device for jamming wireless signals in a geographic delimited area of claim 1; where said user has the option of selecting a plurality of type of jamming signals that said Signal Transmitter will transmit once it is turned on; where a type of signal is a Wi-Fi jamming signal; where a type of signal is a mobile cellphones jamming signal; where a type of signal is a radio wireless jamming signal.

* * * * *